(12) United States Patent
Adams et al.

(10) Patent No.: US 8,060,539 B2
(45) Date of Patent: Nov. 15, 2011

(54) METHOD OF NOTIFYING AN INVITEE TO AN EVENT OF CHANGES TO THE EVENT IN AN ELECTRONIC CALENDAR SYSTEM

(75) Inventors: Neil Adams, Waterloo (CA); Herb Little, Waterloo (CA); Melissa Adams, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 671 days.

(21) Appl. No.: 11/063,567

(22) Filed: Feb. 24, 2005

(65) Prior Publication Data

US 2006/0190485 A1   Aug. 24, 2006

(51) Int. Cl.
  *G06F 17/30* (2006.01)
(52) U.S. Cl. ............................................ 707/804
(58) Field of Classification Search ............... 709/246; 707/1–10, 100–104.1, 200–206; 379/88.19; 705/9
  See application file for complete search history.

(56) References Cited

U.S. PATENT DOCUMENTS

| | | | |
|---|---|---|---|
| 5,467,268 A | 11/1995 | Sisley et al. | |
| 5,732,399 A | 3/1998 | Katiyar et al. | |
| 5,790,974 A | 8/1998 | Tognazzini | |
| 5,943,652 A | 8/1999 | Sisley et al. | |
| 5,960,406 A | 9/1999 | Rasansky et al. | |
| 6,085,166 A | 7/2000 | Beckhardt et al. | |
| 6,094,681 A | 7/2000 | Shaffer et al. | |
| 6,101,480 A | 8/2000 | Conmy et al. | |
| 6,167,379 A | 12/2000 | Dean et al. | |
| 6,279,000 B1 | 8/2001 | Suda et al. | |
| 6,370,566 B2 | 4/2002 | Discolo et al. | |
| 6,580,787 B1 | 6/2003 | Akhteruzzaman et al. | |
| 6,594,637 B1 | 7/2003 | Furukawa et al. | |
| 6,594,664 B1 | 7/2003 | Estrada et al. | |
| 6,732,080 B1 * | 5/2004 | Blants | 705/9 |
| 6,781,920 B2 | 8/2004 | Bates et al. | |
| 6,785,868 B1 | 8/2004 | Raff | |
| 6,791,582 B2 | 9/2004 | Linsey et al. | |
| 6,792,087 B2 | 9/2004 | Abdoh | |
| 6,801,819 B1 | 10/2004 | Barto et al. | |
| 7,188,073 B1 * | 3/2007 | Tam et al. | 705/9 |
| 7,233,933 B2 * | 6/2007 | Horvitz et al. | 706/21 |
| 2002/0131565 A1 * | 9/2002 | Scheuring et al. | 379/88.19 |
| 2002/0174145 A1 * | 11/2002 | Duga et al. | 707/513 |
| 2004/0064585 A1 * | 4/2004 | Doss et al. | 709/246 |
| 2004/0162882 A1 * | 8/2004 | Mora | 709/207 |
| 2004/0167877 A1 * | 8/2004 | Thompson, III | 707/3 |
| 2004/0204074 A1 * | 10/2004 | Desai | 455/557 |
| 2004/0215499 A1 | 10/2004 | Leist | |
| 2006/0020889 A1 * | 1/2006 | Coppinger et al. | 715/710 |

OTHER PUBLICATIONS

"Method of Automatic Calendar Update and Notification". IBM Technical Disclosure Bulletin, IBM Corp. New York, US, vol. 37 No. 3, Mar. 1, 1994, p. 237, XP000441456, ISSN: 0018-8689. "Post an addendum to meeting notices on the calendar". Research Disclosure, Kenneth Mason Publications, Westbourne, GB, vol. 347 No. 42, Mar. 1993, XP007118817, ISSN: 0374-4353.
Patent Abstracts of Japan, vol. 2003, No. 12, Dec. 5, 2003, and JP 2004 362242 A (Canon Inc), Dec. 24, 2004.

\* cited by examiner

*Primary Examiner* — Diane Mizrahi
(74) *Attorney, Agent, or Firm* — Norton Rose OR LLP (57) ABSTRACT

The present invention provides a method for notifying at least one invitee of an initial event of changes to the initial event. The method comprises receiving the initial event comprising a plurality of initial event elements and receiving an updated event comprising a plurality of updated event elements, each updated event element corresponding to a respective initial event element. The updated event elements are compared to the initial event elements to determine which of the updated event elements are changed event elements that differ from their respective initial event elements and the at least one invitee is notified of any specific changed event elements.

17 Claims, 7 Drawing Sheets

METHOD OF NOTIFYING AN INVITEE TO AN EVENT OF CHANGES TO THE EVENT IN AN ELECTRONIC CALENDAR SYSTEM

FIELD OF THE INVENTION

This invention relates to the field of electronic calendars and specifically to a method of notifying a user of updated calendar items.

BACKGROUND OF THE INVENTION

Personal computers, portable computers and mobile electronic devices (such as personal data assistants "PDAs") are commonplace and numerous software has been developed to be executed on these devices that allow users to store schedules of events into an electronic calendar. Typically, such programs also generate visual displays that illustrate the events that will occur during a specified time. Users enter information about an event, such as, for example, time, place, topic and invitees. This information is then stored in the electronic calendar at the appropriate date and time and containing the relevant event information. Common features of electronic calendars include alarms to signal that an event is scheduled to begin or reminders which signal in advance that there is an event scheduled for the near future.

With the development of electronic communication and computer and wireless networks, it is common for a user to schedule meetings and events with invitees electronically. The user notifies invitees of an event by sending an electronic invitation. Invitees receive the electronic invitation, typically via an electronic mail (e-mail) containing the relevant event information to store the event information is stored in the invitee's electronic calendar. Electronic invitations often provide the invitees with an option to accept or decline the event. The event is then stored in an invitee's calendar only on accepting the invitation to the event.

After the initial invitation is sent, it is often the case that the details of the event will change, such as, for example, the time or location. In this instance, the user can update the event and an updated event will be sent to the invitees. In some cases, as with the initial event, invitees may be provided with the option to accept or decline the update event before the updated event is stored in an invitee's calendar. The invitees receive the updated event with the updated event information and the invitees must review the entire updated event to ascertain what has changed from the initial event.

A solution to one or more of these shortcoming is desired.

SUMMARY OF THE INVENTION

According to one broad aspect of the invention, there is provided a method for notifying at least one invitee of an initial event of changes to the initial event comprising receiving the initial event comprising a plurality of initial event elements, receiving an updated event comprising a plurality of updated event elements, each updated event element corresponding to a respective initial event element, comparing the updated event elements to the initial event elements to determine which of the updated event elements are changed event elements that differ from their respective initial event elements and notifying the at least one invitee of any specific changed event elements.

Preferably, the method includes notifying the invitee of both the initial event and the updated event.

Preferably, notifying the at least one invitee of any specific changed event elements includes notifying of the updated event in a single notification.

According to another aspect of the invention, there is provided a computer readable memory storing statements and instructions for use in the execution in a computer of the methods of the invention. The computer readable memory is preferably located in a personal data assistant.

According to another aspect of the invention, there is provided a data carrier product containing sequences of instructions which when executed causes the performance of the methods of the invention.

According to another aspect of the invention, there is provided a software product containing sequences of instructions which when executed causes the performance of the methods of the invention.

According to another aspect of the invention, there is provided an integrated circuit product containing sequences of instructions which when executed causes the performance of the methods of the invention.

BRIEF DESCRIPTION OF THE DRAWINGS

Embodiments of the invention may best be understood by referring to the following description and accompanying drawings. In the description and drawings, like numerals refer to like structures or processes. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention.

Method. Generally, in accordance with an aspect of the invention, there is provided methods for notifying at least one invitee of an initial event, of changes to the initial event.

Figure 1A:
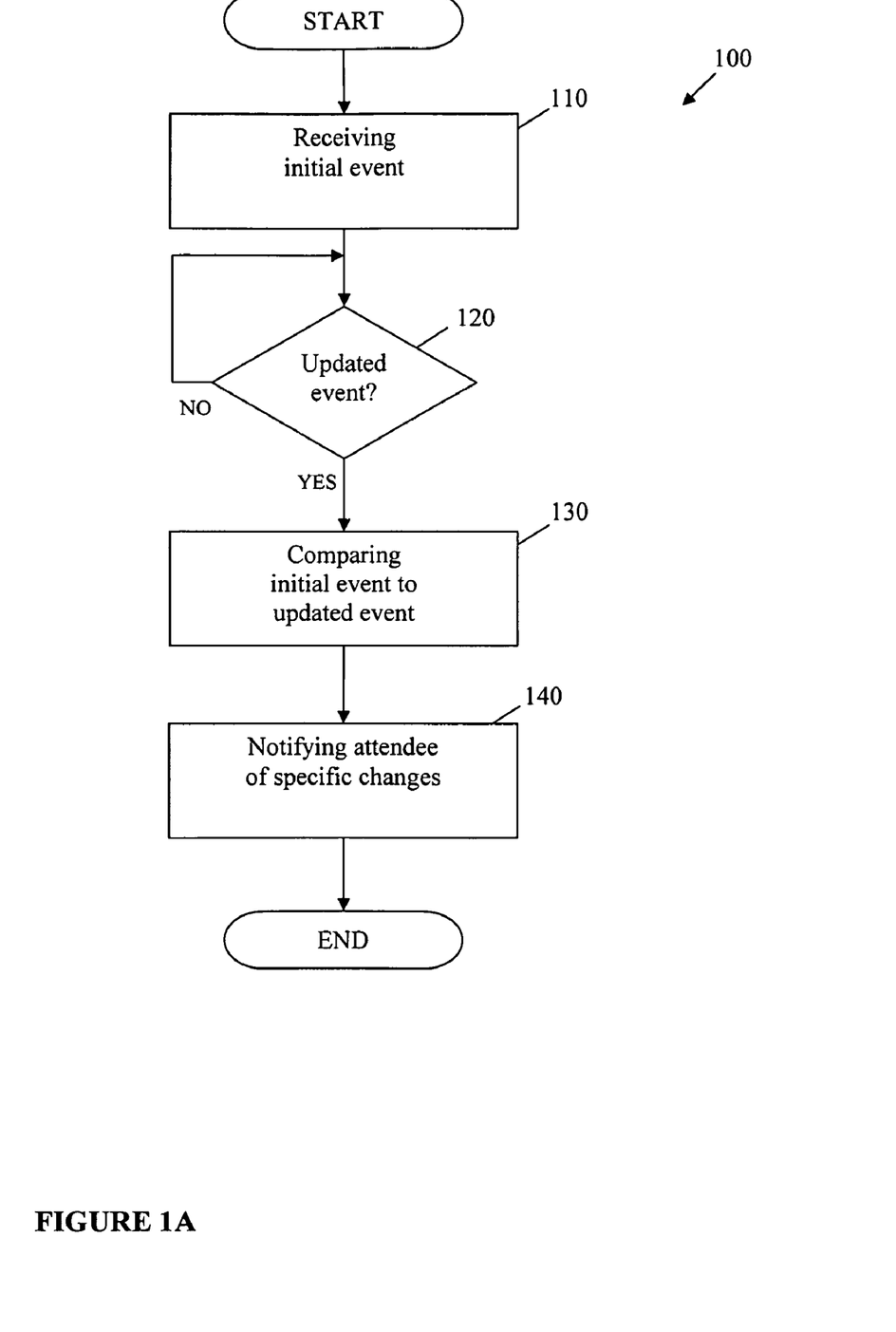
FIG. 1A is a flowchart illustrating operations for notifying at least one invitee, of an initial event, of changes to the initial event according to a first embodiment of the invention.

Referring to FIG. 1, operations 100 for notifying at least one invitee of an initial event, of changes to the initial event according to a broad embodiment of this aspect of the invention are provided. At step 110, an initial event is received from a user. The user typically inputs, via a graphical user interface (GUI) for the electronic calendar, the initial event by inputting a plurality of initial event elements into event fields which comprise the event. Initial event elements may relate to, but are not limited to, the date, time, duration, subject and location of the event as well as any comments associated with the event.

If an updated event is received from the user at step 120, then operations will proceed to step 130. At step 130, the event fields of the initial event is compared to the event fields of the updated event. The event fields of the updated event have respective updated event elements each of which correspond to a respective initial event element. Specifically, each initial event element is compared to its respective updated event element. Thus, the initial subject will be compared with the updated subject; the initial location of the event will be compared to the updated location of the event and so on. This comparison will identify which of the initial event elements have been changed to changed event elements. A person skilled in the art will understand that various methods are available to compare the initial event elements to the updated event elements, such as a simple string comparison between various fields of the initial event and the updated event.

At step 140, the invitee is notified of the specific changes to the initial event. The change notification preferably identifies (i) that an initial event element has changed, (ii) the initial event element and (iii) the changed event element. Other manners of indicating the changed event elements may be used. For example, the changed items may be delimited with special characters such as "*" or "!" or the like. Other indicators may include bolding the changed field, changing the colour of the text or the background text.

Advantageously, this permits the invitee to quickly identify what has changed regarding the initial event as compared to the updated event.

Figure 1B:
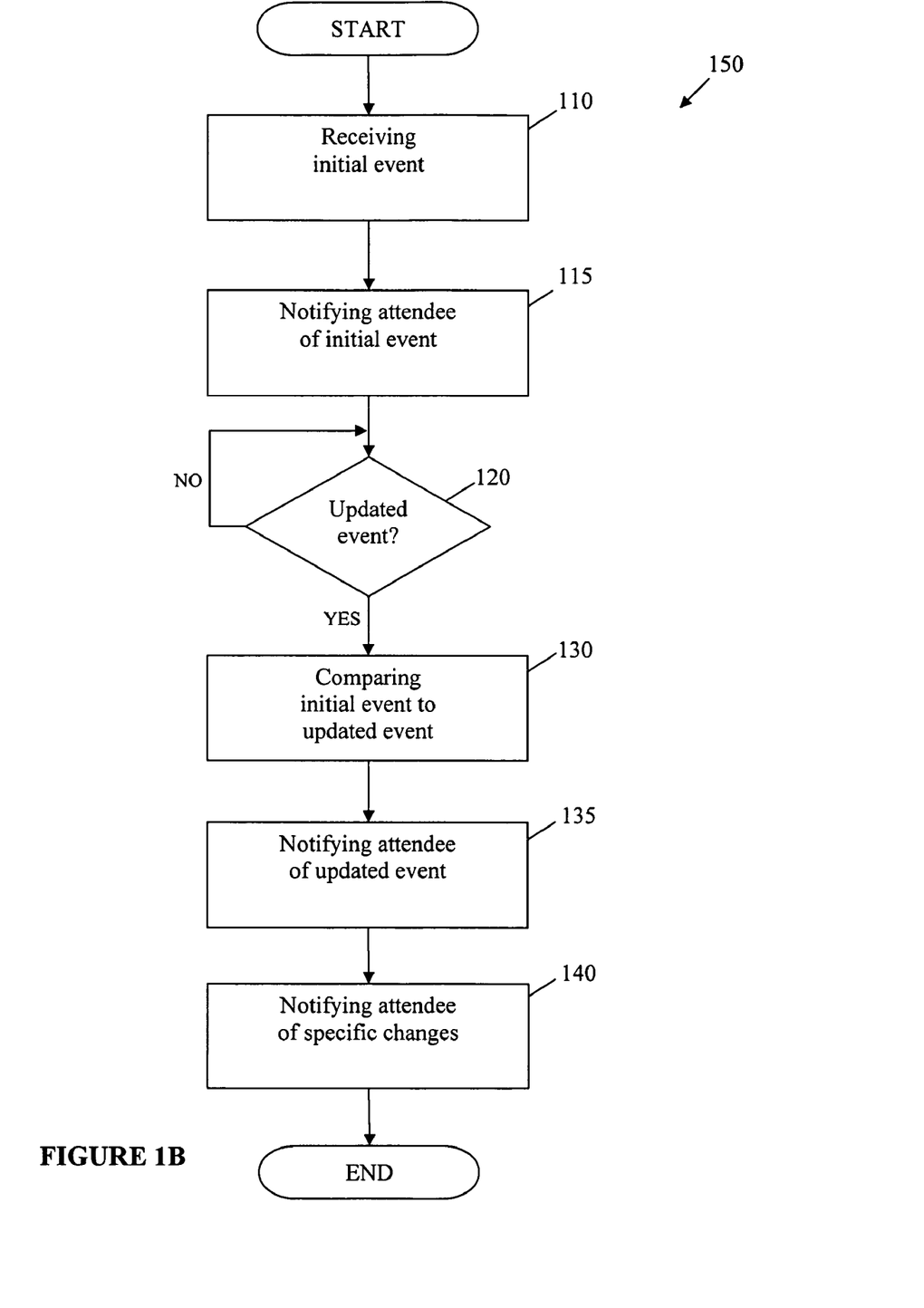
FIG. 1B is a flowchart illustrating operations for notifying at least one invitee, of an initial event, of changes to the initial event according to a second embodiment of the invention wherein the invitee is notified of the initial event and the updated event.
Figure 3A:
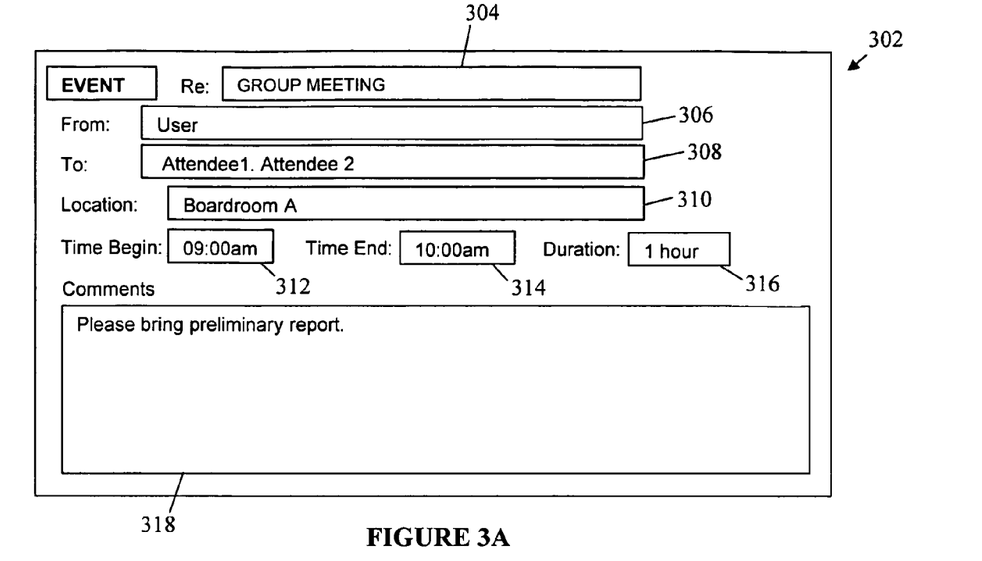
FIG. 3A shows an initial event notification according to the second embodiment of the invention.

The invention will now be described more specifically with respect to a second embodiment of the invention. A person skilled in the art would understand that the present invention may be used in traditional electronic calendar systems in which invitees are notified of the initial event and the updated event. Referring to FIG. 1B, operations 150 are provided according to this second embodiment of the invention. This embodiment contains additional step 115 and step 135. At step 115, the invitee is notified of the initial event such as by sending an initial event notification. The initial event may then be displayed, showing the initial event elements to the invitee. Referring to FIG. 3A, one example of an initial event notification 302 is shown. The initial event notification contains numerous event fields including a subject field 304, a "from" field 306, a "to" field 308, a location field 310, a "time begin" field 312, a "time end" field 314, a duration field 316 and a comments field 318. Each field contains respective initial event elements. For example, "time begin" field 312 contains the initial event element "09:00 am". It will be understood by a person skilled in the art that any event field may contain an initial event element representing no data.

Therefore, for example, if the location of the event has changed from "Boardroom A" to "Boardroom B", a comparison, at step 130, of location field 310 between the initial event and the updated event would reveal that "Boardroom B" is a changed element. A comparison of comments field 318 preferably includes a comparison using a line-by-line comparison tool, of type that is known in the art, to show the specific changes in the comments section if any.

At step 135, the invitee is notified of the updated event and the updated event elements. A typical updated event notification would resemble initial event notification 302 but with all the initial event elements replaced with updated event elements, which would include at least one changed event element.

Figure 3B:
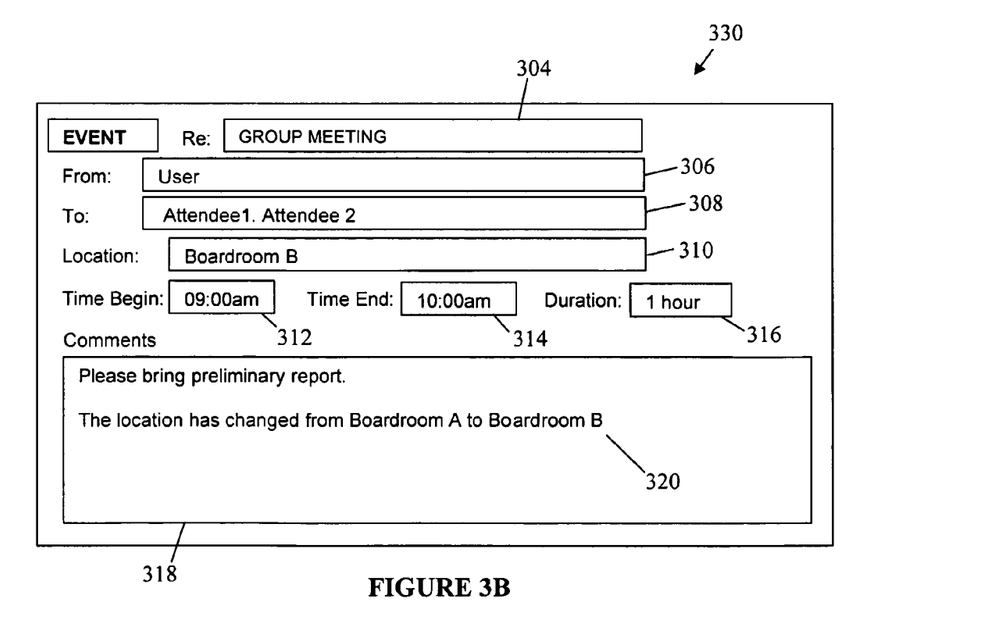
FIG. 3B shows an updated event notification according to the second embodiment of the invention.

Thus, in this embodiment, if the location of the "Group Meeting" of FIG. 3A changed from "Boardroom A" to "Boardroom B", then the invitee would be notified by using a change notification identifying that "The location has changed from Boardroom A to Boardroom B". It will be understood by a person skilled in the art that numerous methods of change notification are possible. For example, the invitee could receive the change notification in an e-mail message. Preferably, the change notification could be included in the updated event, for example, in the comments section as shown in FIG. 3B. FIG. 3B shows an updated event notification 330 with a change notification 320 in comments field 318.

Figure 2:
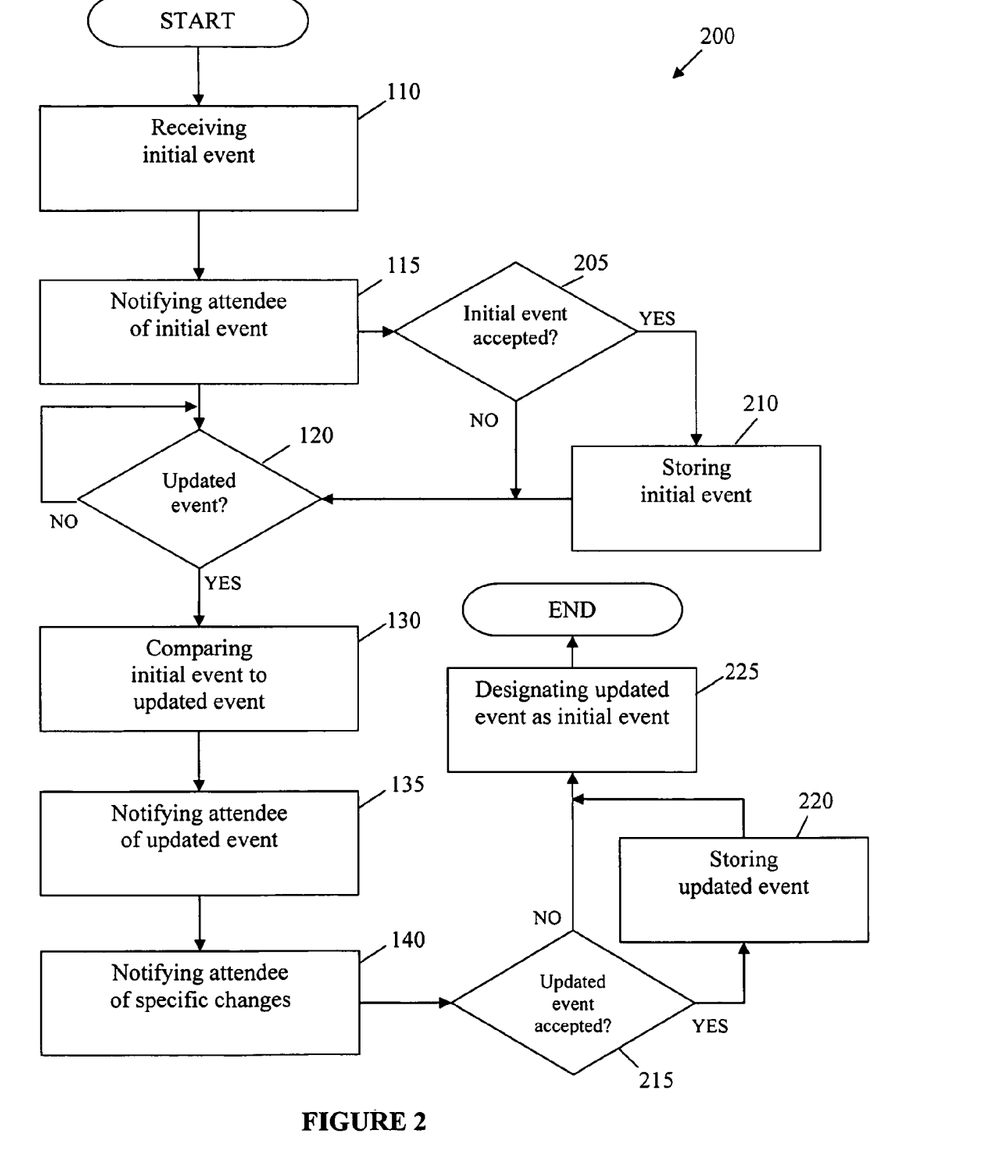
FIG. 2 is a flowchart illustrating operations of the invention according to a third embodiment of the invention, wherein an event is stored in an invitee's electronic calendar in response to the invitee accepting or declining the event.
Figure 3C:
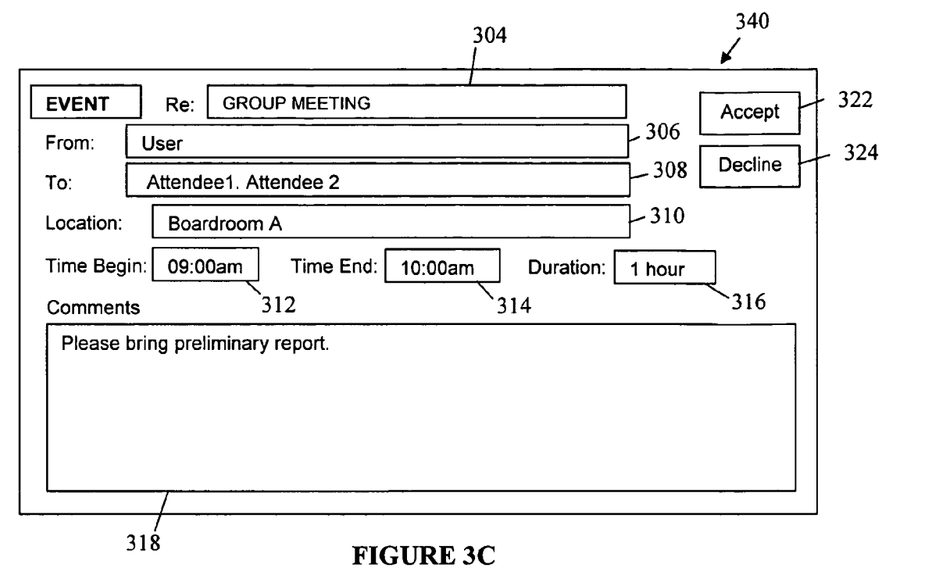
FIG. 3C shows an initial event notification according to the third embodiment of the invention.
Figure 3D:
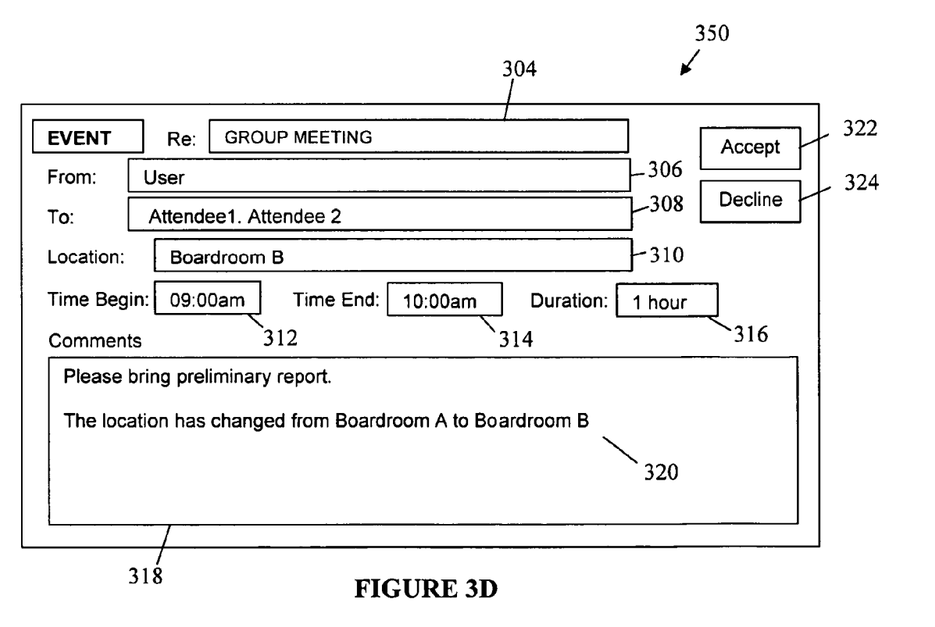
FIG. 3D shows an updated event notification according to the third embodiment of the invention.

Referring to FIG. 2, operations 200 illustrate a method of notifying an invitee of changes to an initial event according to a third embodiment of the invention. Operations 200 include additional steps 205, 210, 215 and 220 which allow an invitee to either accept or decline an event and store an event in response to the invitee accepting the event. Referring to FIG. 3C, in this embodiment of the invention, an initial event notification 340 includes an accept button 322 and a decline button 324 for accepting or declining the initial event. Therefore, at additional step 205, if the invitee accepts the initial event, then at step 210, the initial event is stored in the invitee's electronic calendar. Referring to FIG. 3D, an update event notification 350 according to this embodiment similarly includes accept button 322 and decline button 324 and change notification 320. Therefore, after the invitee is notified of the updated event at step 135 and the changes thereto at step 140, preferably using update notification 350, the updated event may be accepted at step 215 and in response, stored in the invitee's calendar at step 220.

A person skilled in the art would understand that when an invitee accepts or declines an event using the accept and decline buttons 322, 324, a message can be preferably sent to the user informing the user thereof.

A person skilled in the art would understand that the methods of the present invention may be repeated for multiple updates. In this instance, it will be understood that the methods may be modified so that each updated event is compared to the immediately previous updated event, as opposed to each subsequent updated event being compared to the same original initial event. For example, referring again to FIG. 2, operations 200 include additional step 225. At step 225, the updated event is designated as the initial event. Therefore, at step 130 of subsequent execution of operations 200, comparing the initial event to the updated will comprise comparing an updated event to the immediately previous updated event (or initial event if there were no previous updates).

Figure 5:
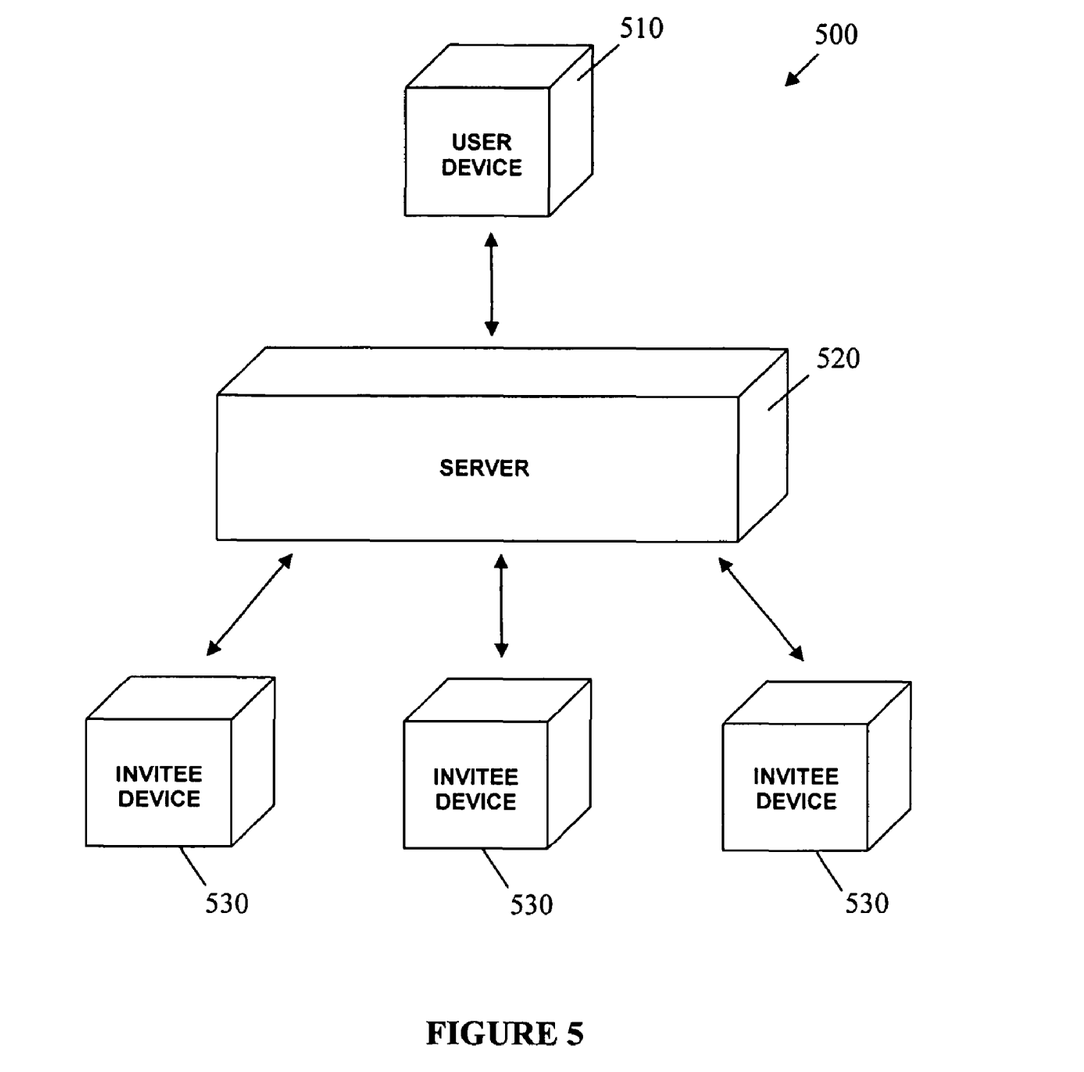
FIG. 5 shows a system comprising possible devices of the invention executing the methods of the invention.

Device and Memory. It will be understood by a person skilled in the art that instructions representing the methods of the present invention may be stored and executed from a computer readable memory located on one of any number of devices in the path between a user and an invitee. Referring to FIG. 5, a system 500 according to the one embodiment of the invention is shown comprising a user device 510, a server 520 and at least one invitee device 530. A user inputs an initial event followed by an updated event using user device 510.

User device 510 may therefore be a desktop computer, PDA, laptop or similar device capable of inputting an event into an electronic calendar system. User device 510 is coupled for communication with Server 520. Server 520 may be an Internet, e-mail Server or a local exchange server such as a Microsoft Outlook Exchange™ Server. Server 520 routes the initial event and updated event to invitee devices 530. Invitee device 530 may be a desktop computer, PDA, laptop or similar device capable of receiving an event notification. Invitee device 520 is coupled for communication with Server 520. Instructions representing the methods of the present invention, thus comparing the received initial event and the updated event and the subsequently generating a notification of the changed event elements, may be stored and executed from any of user device 510, server 520, invitee device 530 or combination thereof.

Figure 4:
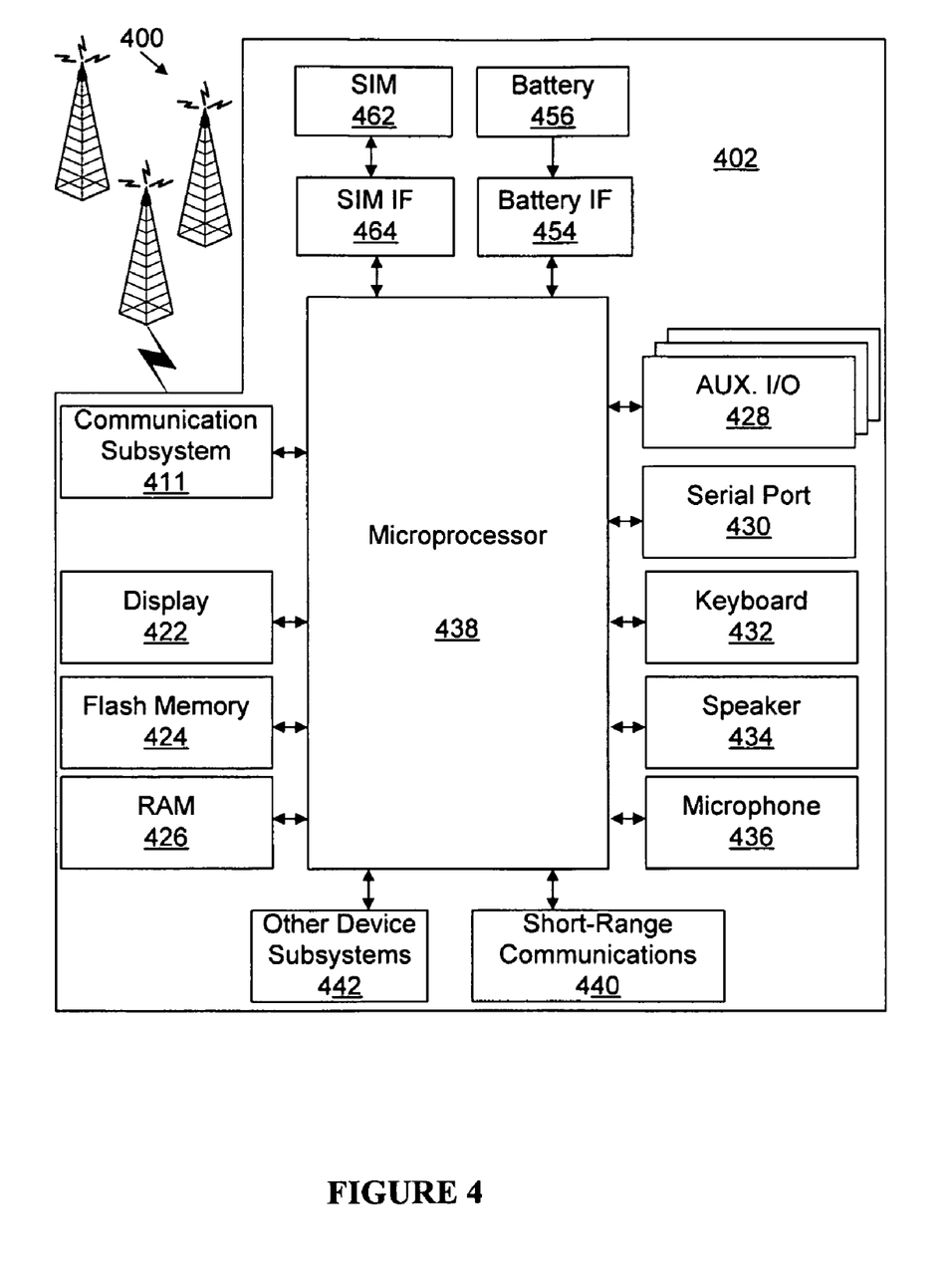
FIG. 4 shows a mobile electronic device having a computer readable memory storing statements and instructions for use in the execution by a microprocessor of the methods of the invention.

Electronic calendars incorporating the methods of the present invention are particularly suited to mobile electronic devices that are capable of connecting to a network. Referring to FIG. 4, a mobile electronic device 402 is shown. The mobile electronic device 402 is preferably a two-way communication device having at least voice and advanced data communication capabilities, including the capability to communicate with other computer systems. Depending on the functionality provided by mobile electronic device 402, it may be referred to as a data messaging device, a two-way pager, a cellular telephone with data messaging capabilities, a wireless Internet appliance, or a data communication device (with or without telephony capabilities). Mobile electronic device 402 may communicate via a network 400, in this embodiment, any one of a plurality of fixed transceiver stations within its geographic coverage area.

Mobile electronic device 402 will normally incorporate a communication subsystem 411, which includes a receiver, a transmitter, and associated components, such as one or more (preferably embedded or internal) antenna elements and, local oscillators (LOs), and a processing module such as a digital signal processor (DSP) (all not shown). As will be apparent to those skilled in field of communications, particular design of communication subsystem 411 depends on the communication network in which mobile electronic device 402 is intended to operate.

Network access is associated with a subscriber or user of mobile electronic device 402 and therefore mobile electronic device 402 requires a Subscriber Identity Module or "SIM" card 462 to be inserted in a SIM IF 464 in order to operate in the network. Mobile electronic device 202 is a battery-powered device so it also includes a battery IF 454 for receiving one or more rechargeable batteries 456. Such a battery 456 provides electrical power to most if not all electrical circuitry in mobile electronic device 402, and battery IF 454 provides for a mechanical and electrical connection for it. The battery IF 454 is coupled to a regulator (not shown) which provides power V+ to all of the circuitry.

Mobile electronic device 402 includes a controller such as a microprocessor 438 which controls overall operation of mobile electronic device 402. Communication functions, including at least data and voice communications, are performed through communication subsystem 411. Microprocessor 438 also interacts with additional device subsystems such as a display 422, a flash memory 424, a random access memory (RAM) 426, auxiliary input/output (I/O) subsystems 428, a serial port 430, a keyboard 432, a speaker 434, a microphone 436, a short-range communications subsystem 440, and any other device subsystems generally designated at 442. Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list. Operating system software used by microprocessor 438 is preferably stored in a persistent store such as flash memory 424, which may alternatively be a read-only memory (ROM) or similar storage element (not shown). Those skilled in the art will appreciate that the operating system, specific device applications, or parts thereof, may be temporarily loaded into a volatile store such as RAM 426.

Microprocessor 438, in addition to its operating system functions, preferably enables execution of software applications on mobile electronic device 402. A predetermined set of applications which control basic device operations, including at least data and voice communication applications, will normally be installed on mobile electronic device 402 during its manufacture. A preferred application that may be loaded onto mobile electronic device 402 may be a personal information manager (PIM) application having the ability to organize and manage data items relating to the user such as, but not limited to, instant messaging (IM), e-mail, calendar events, voice mails, appointments, and task items. The PIM application would be capable of being stored in a persistent store such as flash memory 424, ROM or similar storage element, or in a volatile store such as RAM 426. The PIM application would comprise the statements and instructions corresponding to the methods of the invention, such as operation 100, 200 for use in the execution by Microprocessor 438. Naturally, one or more memory stores are available on mobile electronic device 402 and SIM 462 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile electronic device user's corresponding data items stored and/or associated with a host computer system thereby creating a mirrored host computer on mobile electronic device 402 with respect to such items. This is especially advantageous where the host computer system is the mobile electronic device user's office computer system. Additional applications may also be loaded onto mobile electronic device 402 through network 400, an auxiliary I/O subsystem 428, serial port 430, short-range communications subsystem 440, or any other suitable subsystem 442, and installed by a user in RAM 426 or preferably a non-volatile store (not shown) for execution by microprocessor 438. Such flexibility in application installation increases the functionality of mobile electronic device 402 and may provide enhanced on-device functions, communication-related functions, or both. For example, secure communication applications may enable electronic commerce functions and other such financial transactions to be performed using mobile electronic device 402.

In a data communication mode, a received signal such as a text message, an e-mail message, or web page download will be processed by communication subsystem 411 and input to microprocessor 438. Microprocessor 438 will preferably further process the signal for output to display 422, to auxiliary I/O device 428 or both. A user of mobile electronic device 402 may also compose data items, such as e-mail messages, for example, using keyboard 432 in conjunction with display 422 and possibly auxiliary I/O device 428. Keyboard 432 is preferably a telephone type keypad, full alphanumeric keyboard or full or condensed QWERTY keypad. These composed items may be transmitted over a communication network through communication subsystem 411.

For voice communications, the overall operation of mobile electronic device 402 is substantially similar, except that the received signals would be output to speaker 434 and signals for transmission would be generated by microphone 436. Alternative voice or audio I/O subsystems, such as a voice message recording subsystem, may also be implemented on mobile electronic device 402. Although voice or audio signal output is preferably accomplished primarily through speaker 434, display 422 may also be used to provide an indication of the identity of a calling party, duration of a voice call, or other voice call related information, as some examples.

Serial port 430 in FIG. 4 is normally implemented in a personal digital assistant (PDA)-type communication device for which synchronization with a user's desktop computer is a desirable, albeit optional, component. Serial port 430 enables a user to set preferences through an external device or software application and extends the capabilities of mobile electronic device 402 by providing for information or software downloads to mobile electronic device 402 other than through a wireless communication network. The alternate download path may, for example, be used to load an encryption key onto mobile electronic device 402 through a direct and thus reliable and trusted connection to thereby provide secure device communication.

Short-range communications subsystem 440 of FIG. 4 is an additional optional component which provides for communication between mobile electronic device 402 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment of the invention, mobile electronic device 402 is configured for sending and receiving data items and includes a PIM for organizing and managing data items relating to the user such as, but not limited to, instant messaging (IM), e-mail, calendar events, calendar appointments, and task items, etc. By way of example, mobile electronic device 402 is configured for voice (which may include push to talk over cellular (POC)) and data services, voice mail service, e-mail service, SMS and chat services to which the user subscribes. To provide a user-friendly environment to control the operation of mobile electronic device 402, PIM together with the operation system and various software applications resident on the station 402 provides a GUI having a main screen from which to access various services via applications stored on said device or available to it.

Data Carrier Product. The sequences of instructions which when executed cause the methods described herein to be performed can be contained in a data carrier product for transmission such as embodied in a carrier wave according to one embodiment of the invention.

Computer Software Product. The sequences of instructions which when executed cause the methods described herein to be performed can be contained in a computer software product according to one embodiment of the invention. This computer software product can be loaded into and run by device 402.

Integrated Circuit Product. The sequences of instructions which when executed cause the methods described herein to be performed can be contained in an integrated circuit product including a coprocessor or memory according to one embodiment of the invention. This integrated circuit product can be installed in device 402.

Although preferred embodiments of the invention have been described herein, it will be understood by those skilled in the art that variations may be made thereto without departing from the spirit of the invention or the scope of the appended claims.

The invention claimed is:

1. A method of notifying at least one invitee device of changes to an initial event, the changes being received at a user device connected to the at least one invitee device by at least one server in a communications network, the method comprising:
   receiving at the user device the initial event comprising a plurality of initial event elements and sending the initial event to the at least one invitee device;
   receiving at the user device an updated event comprising a plurality of updated event elements, each updated event element corresponding to a respective initial event element, the updated event elements comprising at least one changed event element that differs from the respective at least one initial event element;
   automatically providing, at one of the user device, the at least one invitee device, and the at least one server, an explicit notification of the at least one changed event element by:
      automatically identifying the initial event elements from the initial event;
      automatically identifying the updated event elements from the updated event;
      automatically comparing each of the updated event elements to each of the respective initial event elements to determine the at least one changed event element;
      automatically generating the notification, including text indicating that the at least one changed event element is changed from the respective at least one initial event element; and
      automatically adding the notification to the updated event; and
   displaying the updated event including the explicit notification on the at least one invitee device.

2. The method of claim 1, comprising initial event elements selected from the group consisting of a subject of the initial event, a beginning time of the initial event, an end time of the initial event, a duration of the initial event, a location of the initial event, invitees of the initial event and comments associated with the event.

3. The method of claim 1, comprising comparing using a string comparison.

4. The method of claim 1, comparing using a line-by-line comparison tool.

5. The method of claim 1, comprising a notification indicating at least one respective change to the at least one respective initial event element corresponding to the at least one changed element.

6. The method of claim 1, comprising a notification of the updated event in a single notification.

7. The method of claim 6, comprising a notification including a message in a comments element of the updated event.

8. The method of claim 1, comprising storing the initial event and the updated event in an electronic calendar of the at least one invitee device.

9. The method of claim 8, comprising storing at least one of the initial event and the updated event in the electronic calendar of the at least one invitee device in response to at least one of the initial event and the updated event respectively being accepted at the at least one invitee device.

10. The method of claim 1, comprising designating the updated event as a new initial event.

11. The method of claim 1, comprising a notification including at least one indication selected from the group consisting of: delimiting the changed event element with special characters, bolding the changed event element, changing a text colour of the changed event element, changing a background text colour of the changed event element, and combinations thereof.

12. A computer readable storage device storing statements and instructions thereon for use in the execution in a computer of an application for:
   notifying at least one invitee device of changes to an initial event, the changes being received at a user device connected to the at least one invitee device by at least one server in a communications network, the statements and instructions being adapted for:
      receiving at the user device the initial event comprising a plurality of initial event elements and sending the initial event to the at least one invitee device;
      receiving at the user device an updated event comprising a plurality of updated event elements, each updated event element corresponding to a respective initial event element, the updated event elements comprising at least one changed event element that differs from the respective at least one initial event element;
      automatically providing, at one of the user device, the at least one invitee device, and the at least one server, an explicit notification of the at least one changed event element by:
         automatically identifying the initial event elements from the initial event;
         automatically identifying the updated event elements from the updated event;
         automatically comparing each of the updated event elements to each of the respective initial event elements to determine the at least one changed event element;
         automatically generating the notification, including text indicating that the at least one changed event element is changed from the respective at least one initial event element;
         automatically adding the notification to the updated event; and
      displaying the updated event including the explicit notification on the at least one invitee device.

13. The device of claim 12, comprising a notification including at least one indication selected from the group consisting of: delimiting the changed event element with special characters, bolding the changed event element, changing a text colour of the changed event element, changing a background text colour of the changed event element, and combinations thereof.

14. A personal data assistant comprising a computer readable storage device storing statements and instructions thereon for use in the execution in a computer of an application for:
   notifying at least one invitee device of changes to an initial event, the changes being received at a user device connected to the at least one invitee device by at least one server in a communications network, the statements and instructions being adapted for:
      receiving at the user device the initial event comprising a plurality of initial event elements and sending the initial event to the at least one invitee device;
      receiving at the user device an updated event comprising a plurality of updated event elements, each updated event element corresponding to a respective initial event element, the updated event elements comprising at least one changed event element that differs from the respective at least one initial event element;
      automatically providing, at one of the user device, the at least one invitee device, and the at least one server, an explicit notification of the at least one changed event element by:
         automatically identifying the initial event elements from the initial event;
         automatically identifying the updated event elements from the updated event;
         automatically comparing each of the updated event elements to each of the respective initial event elements to determine the at least one changed event element;
         automatically generating the notification including text indicating that the at least one changed event element is changed from the respective at least one initial event element;
         automatically adding the notification to the updated event; and
      displaying the updated event including the explicit notification on the at least one invitee device.

15. The personal data assistant of claim 14, comprising a notification including at least one indication selected from the group consisting of: delimiting the changed event element with special characters, bolding the changed event element, changing a text colour of the changed event element, changing a background text colour of the changed event element, and combinations thereof.

16. A server comprising a computer readable storage device storing statements and instructions thereon for use in the execution in a computer of an application for:
   notifying at least one invitee device of changes to an initial event, the changes being received at a user device connected to the at least one invitee device by at least one server in a communications network, the statements and instructions being adapted for:
      receiving at the user device the initial event comprising a plurality of initial event elements and sending the initial event to the at least one invitee device;
      receiving at the user device an updated event comprising a plurality of updated event elements, each updated event element corresponding to a respective initial event element, the updated event elements comprising at least one changed event element that differs from the respective at least one initial event element;
      automatically providing, at one of the user device, the at least one invitee device, and the at least one server, an explicit notification of the at least one changed event element by:
         automatically identifying the initial event elements from the initial event;
         automatically identifying the updated event elements from the updated event;
         automatically comparing each of the updated event elements to each of the respective initial event elements to determine the at least one changed event element;
         automatically generating the notification, including text indicating that the at least one changed event element is changed from the respective at least one initial event element; and automatically adding the notification to the updated event; and displaying the updated event including the explicit notification on the at least one invitee device.

17. The server of claim 16, comprising a notification including at least one indication selected from the group consisting of: delimiting the changed event element with special characters, bolding the changed event element, changing a text colour of the changed event element, changing a background text colour of the changed event element, and combinations thereof.

\* \* \* \* \*